United States Patent [19]

Barnard et al.

[11] 4,239,548
[45] Dec. 16, 1980

[54] TITANIUM DIOXIDE PIGMENT

[75] Inventors: Brian Barnard, Middlesbrough; William T. Laverick, Sedgefield, both of England

[73] Assignee: Tioxide Group Limited, Billingham, England

[21] Appl. No.: 100,716

[22] Filed: Dec. 6, 1979

[30] Foreign Application Priority Data

Dec. 21, 1978 [GB] United Kingdom ............... 49610/78
Nov. 20, 1979 [GB] United Kingdom ............... 40132/79

[51] Int. Cl.$^3$ ................................................ C09C 1/36
[52] U.S. Cl. .................................................... 106/300
[58] Field of Search ............................. 106/300, 308 B

[56] References Cited

U.S. PATENT DOCUMENTS

| | | | |
|---|---|---|---|
| 3,330,798 | 7/1967 | Deissmann et al. | 106/300 |
| 3,512,007 | 5/1970 | Lederer | 106/300 |
| 3,767,455 | 10/1973 | Claridge et al. | 106/300 |
| 4,052,224 | 10/1977 | Howard | 106/300 |

Primary Examiner—James Poer
Attorney, Agent, or Firm—Schuyler, Banner, Birch, McKie & Beckett

[57] ABSTRACT

Commercial titanium dioxide pigments to be used in paper laminates have been prepared by a method which involves calcining a coated pigment. A new pigment having an excellent stability to degradation by light when used in such laminates is produced without calcination of the coated pigment.

The pigment comprises rutile titanium dioxide particles having an inner coating containing cerium and phosphate radicals and an outer coating containing aluminium and phosphate radicals and optionally hydrous alumina.

The pigment preferably contains a surface stabilizer such as a fluoride, preferably calcium fluoride. Amounts of cerium phosphate are from 0.05% to 1% (as $CeO_2$) and of aluminium phosphate between 0.05% and 5% by weight (as $Al_2O_3$) on $TiO_2$.

18 Claims, No Drawings

TITANIUM DIOXIDE PIGMENT

This invention relates to a titanium dioxide pigment of improved light stability and particularly to a pigment for use in laminates.

According to the present invention titanium dioxide pigment comprises particles of rutile titanium dioxide which have an inner coating comprising cerium and phosphate radicals and an outer coating covering the inner coating and comprising aluminium and phosphate radicals.

According to the invention also a process for the manufacture of a titanium dioxide pigment comprises adding to an aqueous dispersion of pigmentary rutile titanium dioxide a water-soluble cerium compound followed by a water-soluble phosphate or phosphoric acid followed by a water-soluble aluminium compound and changing the pH of the mixture to a value of from 5 to 7.5 to effect deposition of the coating.

Titanium dioxide pigment having a coating in accordance with the present invention has an improved light fastness when used in resin compositions in laminates. Hitherto, pigments having an acceptable light fastness when used in such resin compositions have been prepared by a process which commonly involves coating the pigments with one or more hydrous oxides and then subjecting the coated pigment to a heat treatment step. Pigments of the present invention require no such heat treatment to achieve the particularly high degree of fastness to light when used in such laminates.

It is believed that the pigments of the present invention have an inner coating of water-insoluble cerium phosphate with an outer coating including water-insoluble aluminium phosphate. In the most preferred form of pigment the inner coating of cerium phosphate is in contact directly with the surface of the titanium dioxide particles. Preferably the pigment is also associated with a surface stabiliser.

The inner layer of cerium phosphate usually is present in an amount equivalent to 0.05% to 1% (expressed as $CeO_2$) based on the weight of titanium dioxide in the pigment. Preferably the amount of cerium phosphate present as the inner layer is from 0.1 to 0.4% by weight (expressed as $CeO_2$) on the weight of $TiO_2$ in the pigment.

Usually the amount of aluminium phosphate included in the outer layer covering or encapsulating the cerium phosphate is from 0.05 to 5% by weight expressed as $Al_2O_3$ and based on the weight of $TiO_2$ in the pigment and preferably the amount of aluminium phosphate is from 0.1 to 2% (expressed as $Al_2O_3$) by weight of $TiO_2$. Preferably the outer layer also includes hydrous aluminium oxide to improve the processibility of the pigment.

The titanium dioxide which is to be coated in accordance with the present invention may be that obtained by the "sulphate" process or that obtained by the "chloride" process. The "sulphate" process for the manufacture of titanium dioxide involves the digestion of a titaniferous ore with concentrated sulphuric acid and the subsequent hydrolysis of the titanyl sulphate solution obtained by the dissolution of the digestion cake. Subsequently the hydrous titanium dioxide obtained by hydrolysis is calcined at an elevated temperature.

The chloride process involves the oxidation in the vapour phase of a titanium halide, usually titanium tetrachloride, to produce titanium dioxide directly in pigmentary form.

The titanium dioxide to be coated in accordance with the present invention is rutile titanium dioxide and should preferably contain at least 95% by weight of the titanium dioxide in the rutile form. Most preferably the pigment contains at least 98% by weight of the titanium dioxide in the rutile form. Pigments of particular usefulness contain in excess of 99% by weight of the titanium dioxide in the rutile form.

Pigments according to the present invention are prepared by forming an aqueous dispersion of the rutile "sulphate" or "chloride" titanium dioxide to be coated and then adding to the dispersion in the appropriate sequence the required coating reagents to form the desired coatings on the particles of pigment. In the case of "sulphate" pigment usually the dispersion is milled, for example in a sand mill prior to the coating reagents being added. Usually the pigment is dispersed with the assistance of a dispersion agent and depending on the particular form of the pigment suitable dispersion agents are inorganic or organic compounds such as sodium hexametaphosphate or amines. In those cases when a "sulphate" based titanium dioxide pigment free of zinc is to be coated then it is desirable to effect the dispersion of the pigment through the use of an organic dispersing agent such as an alkanolamine for example monoisopropanolamine.

In any event, where a dispersing agent is used the amount of the dispersing agent should preferably be low and is only that which is sufficient to effect the required degree of dispersion. For instance when monoisopropanolamine is employed as a dispersant an amount of less than 0.2% based on the weight of $TiO_2$ is recommended.

To the aqueous dispersion of the uncoated titanium dioxide there is added a water-soluble salt of cerium such as cerium sulphate. Usually the water-soluble salt of cerium is added in the form of an aqueous solution in an amount sufficient to provide on the surface of the pigment the chosen amount of cerium phosphate. To the dispersion containing the water-soluble salt of cerium there is then added a water-soluble phosphate or orthophosphoric acid in an amount at least equal to that required to precipitate the whole of the cerium as phosphate. A typical water-soluble phosphate is an alkali metal orthophosphate or ammonium orthophosphate.

When the dispersion contains both the cerium salt and the phosphate or orthophosphoric acid it is believed that the cerium phosphate is deposited as a discrete coating upon the surface of the pigment particles.

To the aqueous suspension containing the titanium dioxide carrying the coating of cerium phosphate there is then added a water-soluble aluminium compound, usually a water-soluble aluminium salt, such as aluminium sulphate although other water-soluble aluminium salts may be used if desired. Usually the water-soluble aluminium salt is added in the form of an aqueous solution in an amount both sufficient to provide the required amount of aluminium phosphate and any hydrous aluminium oxide desired.

If the amount of water-soluble phosphate and/or phosphoric acid added originally is insufficient to provide both the cerium phosphate and the aluminium phosphate then a further amount of water-soluble phosphate and/or phosphoric acid is added to the dispersion. Usually this further amount is added prior to the addition of the water-soluble aluminium compound.

After or during the addition of the water-soluble aluminium compound, the pH of the aqueous dispersion is changed to a value within the range 5 to 7 and usually it will be necessary to add an alkali such as sodium hydroxide to the dispersion to effect this change and to secure the precipitation of the desired outer coating.

The coated pigment is then separated from the solution by filtering and is washed and dried. Usually the pigment is then milled in a fluid energy mill without any addition of an organic compound.

The pigment also preferably contains a surface stabiliser which has the effect of increasing further the resistance of a composition containing the pigment to discolouration by light. Examples of suitable surface stabilisers are the halates and perhalates such as metal chlorates, bromates, iodates, metaperiodates and paraperiodates. Another surface stabiliser is an antimony oxide precipitated into association with the pigment.

These surface stabilisers in some instances are believed to act as oxidising agents.

Preferably the surface stabiliser is a source of fluoride and typical sources which are useful in the present invention are the fluorides of barium, strontium, magnesium, tin, antimony, titanium, zirconium, sodium, potassium, ammonium, lithium, aluminium and zinc and of the rare earth metals. The most preferred source of fluoride is calcium fluoride in its purified form or in its natural form of fluorspar.

Preferably the surface stabiliser is insoluble or only slightly soluble in water and if a soluble source is employed then care should be taken not to wash this out of the pigment after treatment.

The pigment is treated usually with the surface stabiliser either prior to or during the deposition of the coatings. The addition of the surface stabiliser can be made in the form of a solid, or as a milled aqueous dispersion or the surface stabiliser can be formed in situ as a precipitate from suitable reactants, for example, from a soluble metal salt and a soluble fluoride. Should the surface stabiliser itself be water-soluble then this may conveniently be added to the pigment immediately prior to the finishing stage such as fluid energy milling.

The pigments of the present invention are of particular use in the formation of pigmented aminoplastic resinous materials and especially when these are used to form white or coloured laminates which are required to be resistant to discolouration by light. Such laminates are products in which the resin acts not only as reinforcement for one or more layers or masses of such materials as wood, glass fibre and paper or other fabric but also to import strength and durability to the finished product. A typical decorative paper laminate consists of pigmented paper sheets impregnated with resin and cured under pressure and at elevated temperature. The resin may alternatively contain filler such as fibre glass, wood flour etc and be used in safety helmets etc.

Typical aminoplastic resinous materials which may be used with rutile titanium dioxide of the present invention are melamine-formaldehyde, urea-formaldehyde and phenol-formaldehyde resins.

Accordingly the present invention also provides a process for the manufacture of a pigmented aminoplastic resinous material in which a coated titanium dioxide pigment in accordance with the invention is added, if desired with a carrier material comprising a fibrous base, to an aminoplastic resinous material, which is then heated to effect formation of a cross-linked state.

Whilst it is believed that the pigment of the invention is coated with the stated materials this is not restrictive in any way and should be understood to include pigments in which the stated materials have been precipitated into association with the titanium dioxide.

The present invention is illustrated in the following Examples in which the light fastness of the pigment when employed in a decorative laminate was determined by the following general method.

Alpha pulp was lightly processed at 2.5% consistency in a laboratory scale, Hollander beater. By this means the fibre was dispersed without undergoing significant refining or hydration. After processing the stock was diluted to 1.25% consistency.

Using the British Standard Pulp Evaluation Apparatus, a 2 liter aliquot of stock was disintegrated for 10 minutes. 12.0 g pigment to be tested were then added and disintegration continued for 5 minutes. 0.5% $Al_2(SO_4)_3$ (calculated on fibre) was added and disintegration was continued for a further 5 minutes. The disintegrated stock was then diluted to 0.5% consistency.

380 ml dilute stock were placed in the sheet forming machine. After forming the sheet it was dried on a felt covered rotary drier, weighed and ashed. Having ensured that the desired specification ie 125 g/m$^2$ and 25% pigment content (equivalent to ash) had been achieved, further papers were made for subsequent stages in the test procedure.

Samples of paper were immersed in a bath of melamine formaldehyde resin solution, at 47.5% concentration. After 60 seconds the sheet was removed and allowed to drain for 15 seconds. The sheet was then inverted and hung on a suitable rack. When sufficient papers had been impregnated, they were transferred to an oven at 110° C. and they remained there for 10 minutes.

4 commercial core papers impregnated with phenol formaldehyde resin were used for the body of the laminate. The pigmented, impregnated paper to be tested was placed on top. The assembly of papers was placed between mirror finished, stainless steel plates and placed in a hydraulic press equipped with steam heated/water cooled platens. Hydraulic pressure was applied at 1400 pounds/square inch (on the surface of the laminate) and the temperature was raised to 140° C. and maintained for 30 minutes. The press was cooled to ambient temperature, pressure released and the laminate removed.

The laminate was tested for light fastness in accordance with the method described in BS3794:1973 Appendix G. The experimental pigments described in this application gave light fastness results superior to Blue Wool Scale Standard No. 6 (ref BS1006:1953).

EXAMPLE 1

Titanium dioxide which had been prepared by the sulphate process as calciner discharge was milled in a sand mill in the presence of 0.18% monoisopropanolamine (MIPA) on weight of titanium dioxide to give an aqueous milled dispersion containing 200 grams per liter $TiO_2$. The temperature of the aqueous dispersion so obtained was maintained at 50° C. throughout the coating procedure.

To the milled slurry there was added aqueous ceric sulphate solution containing the equivalent of 198 grams per liter $CeO_2$ and in an amount equivalent to 0.3% $CeO_2$ on weight of $TiO_2$ over a period of 5 minutes and then the aqueous dispersion was mixed for a further 10 minutes.

Aqueous monoammonium phosphate solution containing the equivalent of 62 grams per liter $P_2O_5$ and in an amount sufficient to introduce the equivalent of 0.5% $P_2O_5$ on weight of $TiO_2$ was then added over a period of 10 minutes followed by mixing for a further 10 minutes.

To the aqueous dispersion there was then added simultaneously over a period of 10 minutes aqueous ammonium fluoride solution containing 204 grams per liter ammonium fluoride and aqueous calcium chloride solution containing the equivalent of 153 grams per liter calcium chloride in sufficient quantities as to provide 2.0% $CaF_2$ on weight of $TiO_2$. After the addition of these two solutions the aqueous dispersion was then mixed for a further 10 minutes.

To the so obtained aqueous dispersion of pigment there was then added aqueous aluminium sulphate solution containing the equivalent of 99 grams per liter $Al_2O_3$ simultaneously with aqueous sodium hydroxide solution containing the equivalent of 110 grams per liter on weight of NaOH to maintain the pH of the dispersion at about 6 and in amounts sufficient to introduce the equivalent of 4% by weight $Al_2O_3$. The addition took place over a period of 10 minutes and the dispersion so obtained was then mixed for a further 30 minutes.

The aqueous dispersion of treated pigment was then filtered and the pigment washed, dried and fluid energy milled.

The light fastness of the pigment when employed in a decorative laminate had a value of 1, whereas under comparative conditions a commercial non-heat treated titanium dioxide pigment hitherto used in practice had a light fastness value of 2.5. The pigment prepared according to this example had a light fastness when used in a decorative laminate similar to that of a commercial pigment which had been calcined after coating and thus the pigment of the invention has valuable properties obtained without the necessity of an expensive heat treatment stage.

A similar pigment to that of the invention prepared without treatment with calcium fluoride had a light fastness value of 1.75.

EXAMPLE 2

A pigment was prepared by a method similar to that described in Example 1 except that the addition of 2% $CaF_2$ was effected in the form of an aqueous slurry of fluorspar which had been sand milled in the presence of 0.18% of monoisopropanolamine based on the weight of fluorspar and the aqueous milled slurry is introduced into the aqueous dispersion of titanium dioxide after the addition of monoammonium phosphate solution as an aqueous slurry containing 90 grams per liter fluorspar.

The pigment so obtained had a light fastness value of 1.

EXAMPLE 3

The experiment described in Example 2 was repeated except that the 0.3% $CeO_2$ was added in the form of aqueous cerous nitrate solution at a concentration of 200 grams per liter $CeO_2$ over a period of 5 minutes followed by further mixing for 10 minutes.

The pigment so obtained had a light fastness value of 1.

EXAMPLE 4

1000 grams of titanium dioxide pigment in the form of a reactor discharge which had been prepared by the vapour phase oxidation of titanium tetrachloride was dispersed in water with the addition of sodium hexametaphosphate solution having a pH of 10 and in an amount of 0.15% based on $TiO_2$ to produce an aqueous dispersion of the pigment having a concentration of 240 grams per liter. The temperature of the aqueous dispersion was maintained at approximately 50° C. throughout the following coating procedure.

Aqueous ceric sulphate solution containing 198 grams per liter $CeO_2$ was added over a period of 5 minutes in an amount to introduce the equivalent of 0.3% on weight of $CeO_2$. The dispersion was then mixed for a further 10 minutes.

Aqueous monoammonium phosphate solution containing 62 grams per liter $P_2O_5$ was then added over 10 minutes in an amount sufficient to introduce 0.5% $P_2O_5$ and the dispersion mixed for a further 10 minutes.

A pre-milled fluorspar slurry containing 90 grams per liter $CaF_2$ was added to the aqueous dispersion over a period of 10 minutes in an amount sufficient to introduce 2% $CaF_2$ on weight of $TiO_2$. The dispersion was then mixed for a further 10 minutes.

Aqueous aluminium sulphate solution containing the equivalent of 83 grams per liter $Al_2O_3$ was then added to the dispersion over a period of 20 minutes in an amount sufficient to introduce 2.5% $Al_2O_3$ on weight of $TiO_2$. The dispersion was then mixed for a further 20 minutes.

Aqueous sodium hydroxide solution containing 110 grams per liter NaOH was then added in an amount sufficient to produce a pH in the dispersion of about 6. Mixing was continued for a further 20 to 30 minutes.

The coated pigment so obtained was filtered from the dispersion, washed and dried prior to fluid energy milling.

The pigment so obtained had a light fastness value of 1.

EXAMPLE 5

A further pigment was prepared in accordance with the method of Example 4 except that the fluorspar in an amount of 2% by weight of $TiO_2$ was added as a dry, finely ground solid to the aqueous dispersion prior to the addition of salts of sodium.

The pigment so obtained had a light fastness value of 1.

EXAMPLE 6

A similar pigment to that of Example 2 was prepared except that the amount of aqueous monoammonium phosphate solution was sufficient to introduce the equivalent of 2.0% $P_2O_5$ on $TiO_2$.

The light fastness value of the pigment was 1.

EXAMPLE 7

Titanium dioxide which had been prepared by the sulphate process as a zinc-free calciner discharge was lightly milled in a sand mill in the presence of 0.18% monoisopropanolamine (MIPA) on weight of titanium dioxide and then hydroclassified to give an aqueous milled dispersion containing 200 grams per liter $TiO_2$. The temperature of the aqueous dispersion so obtained was maintained at 50° C. throughout the coating procedure.

To the milled slurry there was added aqueous ceric sulphate solution containing the equivalent of 198 grams per liter $CeO_2$ and in an amount equivalent to 0.4% $CeO_2$ on weight of $TiO_2$ over a period of 5 minutes and then the aqueous dispersion was mixed for a further 10 minutes.

Aqueous monoammonium phosphate solution containing the equivalent of 62 grams per liter $P_2O_5$ and in an amount sufficient to introduce the equivalent of 0.5% $P_2O_5$ on weight of $TiO_2$ was then added over a period of 10 minutes followed by mixing for a further 10 minutes.

To the so obtained aqueous dispersion of pigment there was then added aqueous aluminium sulphate solution containing the equivalent of 98.8 grams per liter $Al_2O_3$ in an amount sufficient to introduce the equivalent of 2.5% $Al_2O_3$ on $TiO_2$ over a period of 15 minutes and the mixture was then stirred for a further 10 minutes. Aqueous solution of sodium hydroxide at a concentration of 110 grams per liter NaOH was then added over 15 minutes to give a solution pH of 6 and the aqueous dispersion was mixed for a further period of 10 minutes.

The aqueous dispersion of treated pigment was then filtered and the pigment washed, dried on a band drier prior to being fluid energy milled.

The light fastness of the pigment when employed in a decorative laminate had a value of 1.75, whereas under comparative conditions a commercial non-heat treated titanium dioxide pigment hitherto used in practice had a light fastness value of 2.5. The pigment prepared according to this example had a light fastness when used in a decorative laminate similar to that of a commercial pigment which had been calcined after coating and thus the pigment of the invention has valuable properties obtained without the necessity of an expensive heat treatment stage. A general purpose grade pigment ($TiO_2$) had a light fastness value of 8 when tested similarly.

EXAMPLE 8

A titanium dioxide reactor discharge which had been prepared by the vapour phase oxidation of titanium tetrachloride was dispersed in water with the addition of monoisopropanolamine in an amount of 0.18% on $TiO_2$ and the dispersion hydroclassified to produce an aqueous dispersion containing 240 grams per liter $TiO_2$.

A quantity of the dispersion sufficient to contain 1000 kilograms $TiO_2$ was maintained at 50° C. throughout the following process stages.

To the dispersion there was added aqueous cerium sulphate solution containing 198 grams per liter $CeO_2$ in an amount sufficient to introduce 0.3% $CeO_2$ on $TiO_2$ over a period of 5 minutes. Aqueous dispersion was then mixed for a further 10 minutes.

Aqueous monoammonium phosphate solution containing the equivalent of 62 grams per liter $P_2O_5$ was then added to the aqueous dispersion in an amount sufficient to introduce 2.0% $P_2O_5$ on $TiO_2$ over a period of 20 minutes. The aqueous dispersion was then mixed for a further 10 minutes.

Aqueous aluminium sulphate solution containing 98.8 grams per liter $Al_2O_3$ was added to the aqueous dispersion in an amount sufficient to introduce 2.5% $Al_2O_3$ on $TiO_2$ over a period of 20 minutes prior to stirring for a further 20 minutes.

Aqueous sodium hydroxide solution containing 110 grams per liter NaOH was added over a period of 15 minutes in an amount sufficient to increase the pH of the aqueous dispersion to 6. The mixture was then stirred for a further 15 minutes.

The pigment so obtained was washed after filtering prior to spray drying and final fluid energy milling.

The pigment so obtained was tested to determine the light fastness value and it was found that the pigment had a light fastness value of 1.5.

What is claimed is:

1. A titanium dioxide pigment comprising particles of rutile titanium dioxide having an inner coating comprising cerium and phosphate radicals and an outer coating covering the inner coating and comprising aluminium and phosphate radicals.

2. A pigment according to claim 1 in which the inner coating comprises cerium phosphate in an amount equivalent to 0.05% to 1% expressed as $CeO_2$ on the weight of titanium dioxide in the pigment.

3. A pigment according to claim 2 in which the amount of cerium phosphate is from 0.1 to 0.4% by weight expressed as $CeO_2$ on the weight of $TiO_2$.

4. A pigment according to claim 1 in which the outer coating comprises aluminium phosphate in an amount of from 0.05% to 5% by weight expressed as $Al_2O_3$ on the weight of $TiO_2$ in the pigment.

5. A pigment according to claim 4 in which the amount of aluminium phosphate is from 0.1% to 2% expressed as $Al_2O_3$ by weight of $TiO_2$.

6. A pigment according to claim 1 in which the outer coating also includes hydrous aluminium oxide.

7. A pigment according to any one of the preceding claims in which there is also present a surface stabiliser to increase further the resistance to discolouration by light of a composition containing the pigment and selected from the class of stabilisers consisting of metal halates, metal perhalates, antimony oxide and fluorides of barium, strontium, magnesium, tin, antimony, titanium, zirconium, sodium potassium, ammonium, lithium, aluminium, zinc, rare earth metals and calcium.

8. A pigment according to claim 7 in which the calcium fluoride is fluorspar.

9. A pigment according to claim 1 in which at least 98% by weight of the titanium dioxide is in the rutile form.

10. A process for the manufacture of a titanium dioxide pigment which comprises adding to an aqueous dispersion of pigmentary rutile titanium dioxide a water soluble cerium compound followed by a water soluble phosphate or phosphoric acid followed by a water soluble aluminium compound and changing the pH of the mixture to a value from 5 to 7.5.

11. A process according to claim 10 in which the rutile titanium dioxide is that obtained from the sulphate process and is milled in a sand mill to form the aqueous dispersion.

12. A process according to claim 10 in which the aqueous dispersion of pigmentary rutile titanium dioxide is formed with the assistance of a dispersion agent.

13. A process according to claim 12 in which the dispersion agent is sodium hexametaphosphate or an amine.

14. A process according to claim 11 in which the rutile titanium dioxide is zinc free and milled in the presence of an organic dispersion agent.

15. A process according to claim 10 in which a surface stabiliser is added in solid form to the aqueous dispersion.

16. A process according to claim 10 in which a surface stabiliser is milled in water to form an aqueous dispersion which is then added to the aqueous dispersion of rutile titanium dioxide.

17. A process according to claim 10 in which a surface stabiliser is formed in the aqueous dispersion of rutile titanium dioxide by precipitation from suitable reactants.

18. A process according to claim 10 in which calcium fluoride is added to the particles of rutile titanium dioxide.

* * * * *